E. T. SHAW & J. M. NAUL.
SYSTEM OF REGULATION.
APPLICATION FILED OCT. 11, 1912.
1,063,608.
Patented June 3, 1913.
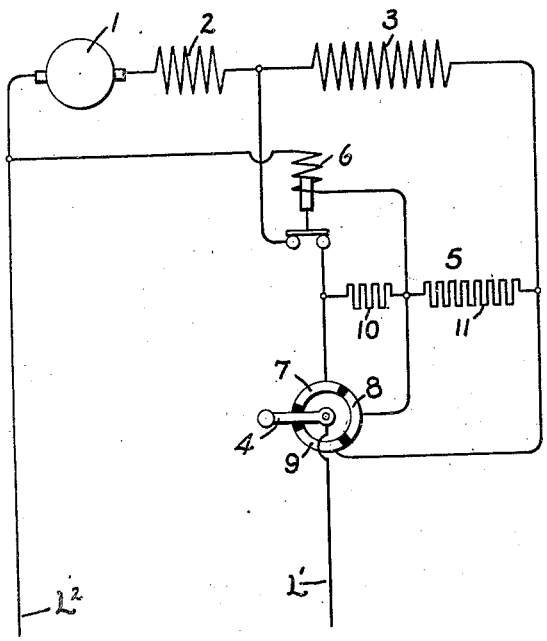
Witnesses:
Anthony Mart.
J. Ellis Glen
Inventors:
Edward T. Shaw,
James M. Naul,
by
Their Attorney.

UNITED STATES PATENT OFFICE.

EDWARD T. SHAW AND JAMES M. NAUL, OF PITTSFIELD, MASSACHUSETTS, ASSIGNORS TO GENERAL ELECTRIC COMPANY, A CORPORATION OF NEW YORK.

SYSTEM OF REGULATION.

1,063,608.  Specification of Letters Patent.  Patented June 3, 1913.

Application filed October 11, 1912. Serial No. 725,119.

*To all whom it may concern:*

Be it known that we, EDWARD T. SHAW and JAMES M. NAUL, citizens of the United States, both residing at Pittsfield, county of Berkshire, State of Massachusetts, have invented certain new and useful Improvements in Systems of Regulation, of which the following is a specification.

Our invention relates to a system of regulation for motors, and is particularly applicable to such a system in which a motor must operate at different times from sources of supply of different voltages.

Our invention has for its object a novel arrangement of parts whereby a motor may operate equally well at any one of a plurality of voltages. To this end, we provide a motor with a field winding divided into a plurality of parts and shunt one of the parts of the field winding by a resistance when the supply voltage is low, opening the shunt when the supply voltage is high. We preferably employ an automatic device for opening and closing the shunt.

Other features of novelty which characterize our invention are pointed out with particularity in claims annexed to and forming a part of this specification.

For a better understanding of our invention, reference may be had to the following description taken in connection with the accompanying drawing, in which the single figure shows diagrammatically a system embodying our invention.

In the drawing, the motor has an armature 1 and a field winding divided into two parts 2 and 3.

L' and L² are supply mains to which the motor is connected by means of a switch 4.

5 is a resistance which is arranged to shunt the part 3 of the field winding when the supply voltage is low. This resistance may also be used to vary the speed of the motor, as will hereinafter appear. The part 3 of the field winding is preferably shunted automatically, and we have shown a relay 6, which is dependent upon the supply voltage, for this purpose. This relay is designed to operate only when the voltage of the supply mains has increased a considerable amount, and is shown as being connected between one of the supply mains and an intermediate point on the resistance 5. The switch 4 has contacts 7, 8 and 9 for connecting the motor to the supply mains and for varying its speed. We have shown the resistance 5 as being divided into two sections 10 and 11, and the coil of the relay 6 connected between the main L² and the junctions of the sections 10 and 11 of the resistance.

The operation of our system of regulation when the supply voltage is low, say 30 volts, is as follows: The arm of the switch 4, is moved so that contact 7 is connected to main L'. Current will then flow through the section of resistance 10, the coil of the relay 6 to the supply main L². The relay, however, being designed to operate only on a considerably higher voltage, will not lift its armature to open the circuit across its contacts. Current will also flow through the part 2 of the field winding and the armature 1 of the motor in series, and a very small amount may flow through the resistance 5 and the part 3 of the field winding in parallel. The motor will now operate at its highest speed for this voltage. If the switch is moved to contact 8, the section 10 of the resistance is placed in parallel with the section 11 of the resistance and the part 3 of the field winding in series, the armature 1 and the part 2 of the field winding being connected in series with this parallel circuit. Since the motor windings 1 and 2 now have a resistance in series with them the motor will operate at a slower speed. If the switch is moved to contact 9, the whole resistance 5 is placed in parallel with the part 3 of the field winding, this parallel circuit being in series with the motor armature 1 and the part 2 of the field winding. The motor now operates at its slowest speed.

The operation of our system when the supply voltage is high, say 60 volts, is as follows: The switch is now moved in the opposite direction from that described above. The supply main L' will be connected to contact 9 first. Current will flow through the section of the resistance 11 and the coil of relay 6 to the other side of the line. Since the supply voltage is now high, the relay will operate to open the circuit across its contacts and current will flow from main L' through the parts of the field winding 3 and 2 and the armature 1 of the motor in series to supply main L². When the switch is on this contact, the motor operates at the highest speed for this voltage. When the switch is moved to contact 8 the section 11 of resistance will be placed in series with the windings of the motor, and the motor will operate at a slower speed. If the switch is moved to contact 7, all the resistance 5 will be placed in series with the motor windings and the motor will operate at its slowest speed.

It has been found advantageous to connect the coil of the relay between one of the supply mains and an intermediate point on the resistance 5, because when operating at the highest supply voltage, the relay will always remain pulled up no matter to which end of the resistance the supply line 1' is connected.

Our invention is particularly useful when the motor is used for driving a fan in Pullman cars. At the present time the various railroads operating in the United States do not have a standard voltage for their train lighting systems, the usual voltages found being 30 or 60. Heretofore, when a car was transferred from one railroad operating at a low voltage to another railroad operating at a high voltage, a resistance was placed in series with the motor. In such an arrangement, a large part of the power is wasted. By our invention, this waste is obviated, and furthermore, the change from one source of supply to another, may be made automatically. In order that the motor runs at substantially the same speeds at both 30 and 60 volts, we have found it desirable to make the resistance of the sections 10 and 11 in a ratio of 18 to 40 and the turns in the parts 3 and 2 of the field winding in the ratio of 2 to 1.

While we have shown the relay 6 shunting the part 3 of the field winding by the resistance 5, it is obvious that the relay may be replaced by a hand operated switch, and we aim in the claims hereto appended to cover such a modification, as well as any modifications of our invention that do not involve a departure from its spirit and scope.

What we claim as new and desire to secure by Letters Patent of the United States, is:

1. In combination, supply mains, a motor comprising an armature and a field winding divided into a plurality of parts, a resistance, and means for placing said resistance in shunt to one of the parts of said field winding when the supply voltage is low and for opening said shunt when the supply voltage is high.

2. In combination, supply mains, a motor comprising an armature and a field winding divided into a plurality of parts, a resistance, and automatic means for placing said resistance in shunt to one of the parts of said field winding when the supply voltage is low and for opening said shunt when the supply voltage is high.

3. In combination, supply mains, a motor comprising an armature and a field winding divided into a plurality of parts, a resistance, and means dependent on the supply voltage for placing said resistance in shunt to one of the parts of said field winding when the supply voltage is low and for opening said shunt when the supply voltage is high.

4. In combination, supply mains, a motor comprising an armature and a field winding divided into a plurality of parts, a resistance, and a relay connected between one of said supply mains and an intermediate point on said resistance for placing said resistance in shunt to one of the parts of said field winding when the supply voltage is low and for opening said shunt when the supply voltage is high.

5. In combination, supply mains, a motor comprising an armature and a field winding divided into a plurality of parts, a resistance, and a relay dependent on the supply voltage and connected between one of said supply mains and an intermediate point on said resistance for placing said resistance in shunt to one of the parts of said field winding when the supply voltage is low and for opening said shunt when the supply voltage is high.

6. In combination, supply mains, a motor comprising an armature and a field winding divided into a plurality of parts, a resistance, means for placing said resistance in shunt to one of the parts of said field winding when the supply voltage is low and for opening said shunt when the supply voltage is high, and means for changing the connection of one of said supply mains to said resistance so as to vary the speed of said motor.

7. In combination, supply mains, a motor comprising an armature and a field winding divided into a plurality of parts, a resistance, automatic means for placing said resistance in shunt to one of the parts of said field winding when the supply voltage is low and for opening said shunt when the supply voltage is high, and means for changing the connection of one of said supply mains to said resistance so as to vary the speed of said motor.

8. In combination, supply mains, a motor comprising an armature and a field winding divided into a plurality of parts, a resistance, means dependent on the supply voltage for placing said resistance in shunt to one of the parts of said field winding when the supply voltage is low and for opening said shunt when the supply voltage is high, and means for changing the connection of one of said supply mains to said resistance so as to vary the speed of said motor.

9. In combination, supply mains, a motor comprising an armature and a field winding divided into a plurality of parts, a resistance, a relay connected between one of said supply mains and an intermediate point on said resistance for placing said resistance in shunt to one of the parts of said field winding when the supply voltage is low and for opening said shunt when the supply voltage is high, and means for changing the connection of one of said supply mains to said resistance so as to vary the speed of said motor.

10. In combination, supply mains, a motor comprising an armature and a field winding divided into a plurality of parts, a resistance, a relay dependent on the supply voltage and connected between one of said supply mains and an intermediate point on said resistance for placing said resistance in shunt to one of the parts of said field winding when the supply voltage is low and for opening said shunt when the supply voltage is high, and means for changing the connection of one of said supply mains to said resistance so as to vary the speed of said motor.

In witness whereof, we have hereunto set our hands this 8th day of Oct., 1912.

EDWARD T. SHAW.
JAMES M. NAUL.

Witnesses:
A. R. NUGENT,
C. S. MEIGS.